United States Patent
Levine et al.

[11] Patent Number: 5,957,484
[45] Date of Patent: Sep. 28, 1999

[54] AIRBAG TEAR SEAM

[75] Inventors: Aaron Benjaman Levine, West Bloomfield; Erik A. Banks, Utica, both of Mich.

[73] Assignee: Breed Automotive Technology, Inc., Lakeland, Fla.

[21] Appl. No.: 09/088,809

[22] Filed: Jun. 2, 1998

[51] Int. Cl.⁶ .................................................... B60R 21/16
[52] U.S. Cl. ........................................ 280/728.3; 280/731
[58] Field of Search .................................. 280/728.3, 731

[56] References Cited

U.S. PATENT DOCUMENTS

| | | | |
|---|---|---|---|
| 5,082,310 | 1/1992 | Bauer | 280/732 |
| 5,172,931 | 12/1992 | Baba et al. | 280/728.3 |
| 5,180,187 | 1/1993 | Müller et al. | 280/732 |
| 5,375,876 | 12/1994 | Bauer et al. | 280/728.3 |
| 5,533,749 | 7/1996 | Leonard et al. | 280/728.3 |
| 5,692,769 | 12/1997 | Scharboneau et al. | 280/728 |
| 5,692,770 | 12/1997 | Scharboneau et al. | 280/728 |

*Primary Examiner*—Kenneth R. Rice
*Attorney, Agent, or Firm*—Lonnie Drayer; Randall Shoemaker

[57] ABSTRACT

The invention relates to a steering wheel and airbag assembly and an integrated steering wheel assembly having a unique tear seam design. The tear seam is incorporated in an airbag scrim that covers the airbag when the airbag is mounted in the steering wheel assembly. In the most preferred embodiment the tear seam is a straight line that bisects the airbag scrim. The tear seam is formed from three walls joined by a first joint and a second joint. The first joint is substantially a right angle joint and the second joint is a radiused joint. Because of its shape, the first joint is less fracture resistant than the second joint. The tear seam design permits a more efficient deployment of the airbag.

8 Claims, 4 Drawing Sheets

AIRBAG TEAR SEAM

BACKGROUND OF THE INVENTION

This invention relates generally to steering wheel assemblies having airbags and, more particularly, to a tear seam in an airbag of a steering wheel assembly.

Airbags typically are located beneath a cover of a steering wheel assembly. Historically, the steering wheel was attached to the vehicle and the airbag module, which included a cover attached over the airbag, was attached.

More recently, steering wheel assemblies have been proposed wherein the steering wheel and airbag are attached to the vehicle as a modular unit. The steering wheel and airbag being assembled together prior to being shipped to the plant building the vehicle or integrating the steering wheel and airbag cover into one continuous piece. A steering wheel and airbag assembly includes a cover, a steering wheel armature, and an airbag. Most covers are formed of a synthetic plastic material that is molded over or positioned over a portion of the steering wheel armature and the airbag. The airbag is generally installed after the cover has been molded and may be installed by a manufacturer other than the manufacturer of the steering wheel armature. Thus, it is generally required that the molding process for the cover provide a cavity between the cover and a portion of the steering wheel armature to accommodate installation of the airbag.

For the airbag to deploy properly it is necessary to provide a means for the airbag to break through the cover. Typically the means provided have included tear seams located in the cover. In past designs these tear seams have generally been either H-shaped, I-shaped, or U-shaped as viewed from the driver's seat. These tear seam shapes have several disadvantages. First, the branched shapes of the tear seams require more energy and time to tear, thus the airbag must be deployed with a very high force for it to deploy and inflate rapidly enough to serve as a crash restraint. Second, these designs limit the area of opening in the cover and tend to cause the airbag to deploy straight outward rather than outward and to the sides. By allowing the airbag to expand quickly to the sides, the airbag inflates with less force and more efficiency.

Thus, it is desirable to provide a tear seam that ruptures more rapidly and that should deploy in response to a lower inflation force. It is also desirable to provide a tear seam having a reduced number of flaps of cover material when it deploys and that deploys to the sides in addition to straight outward.

SUMMARY OF THE INVENTION

In general terms, this invention provides a steering wheel assembly having an airbag tear seam with a structure that permits the airbag to deploy more efficiently.

The present invention provides an airbag tear seam that requires less time to rupture than a branched tear seam, this design should permit the airbag inflation force to be reduced while still permitting rapid deployment of the airbag. The location and orientation of the tear seam permits a wide opening for deployment of the airbag with small flaps of cover material. The present design permits the airbag to deploy to the sides as well as straight outward.

Preferably, the steering wheel and airbag assembly comprises an airbag scrim and a one-piece steering wheel armature. The steering wheel armature includes a hub portion connected to an outer rim portion by a plurality of spokes. The airbag scrim has a linear unbranched tear seam and is secured to the hub portion of the steering wheel armature. The cover material is molded over a portion of the steering wheel armature and a portion of the airbag scrim in an integrated steering wheel assembly, or over the airbag scrim alone in a conventional steering wheel and airbag assembly.

Preferably the airbag tear seam comprises a first wall, a second wall, and a third wall. The first wall is attached to the second wall by a first joint and the third wall is attached to the second wall by a second joint. One of the joints has a lower fracture resistance than the other; which is achieved in the present invention by creating a larger radii in the more fracture resistant joint.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
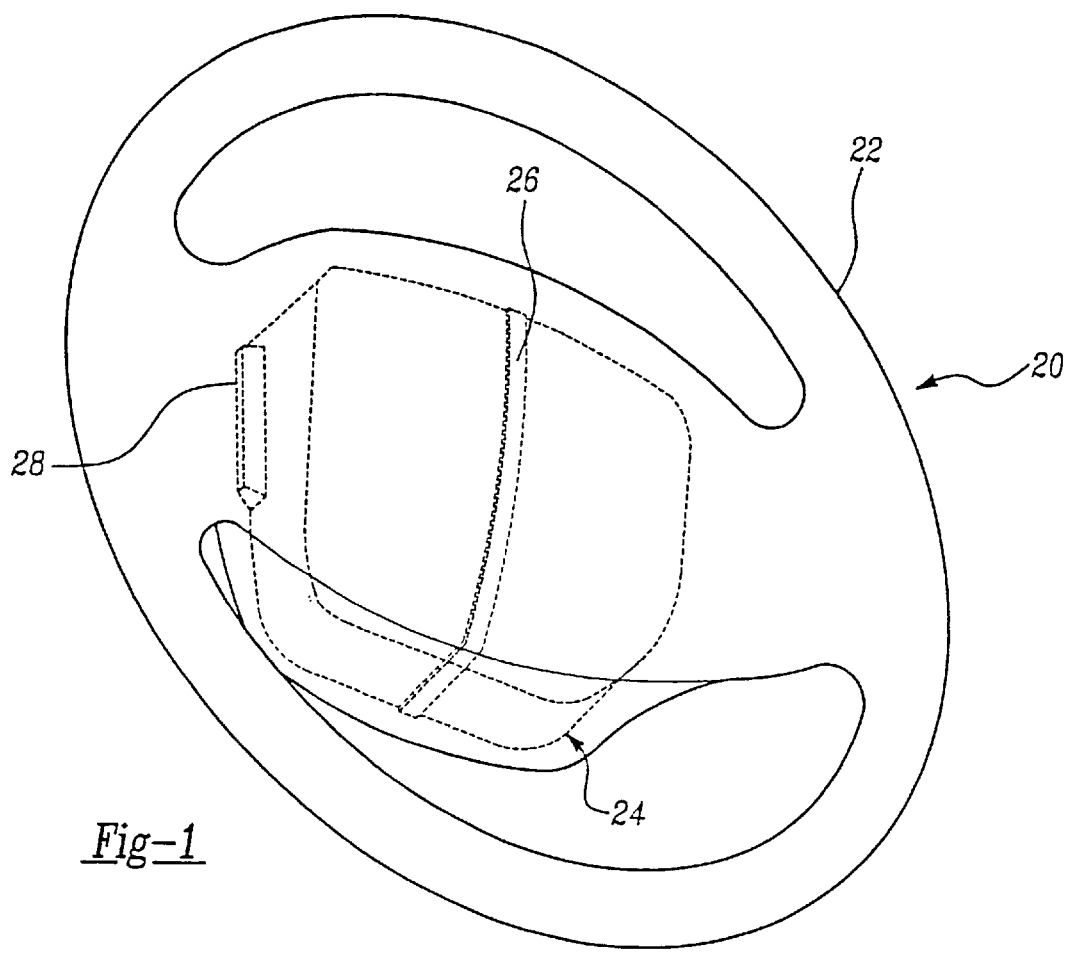
FIG. 1 is a perspective view of an integrated steering wheel assembly, with an airbag scrim shown in phantom, designed according to the present invention.
Figure 3:
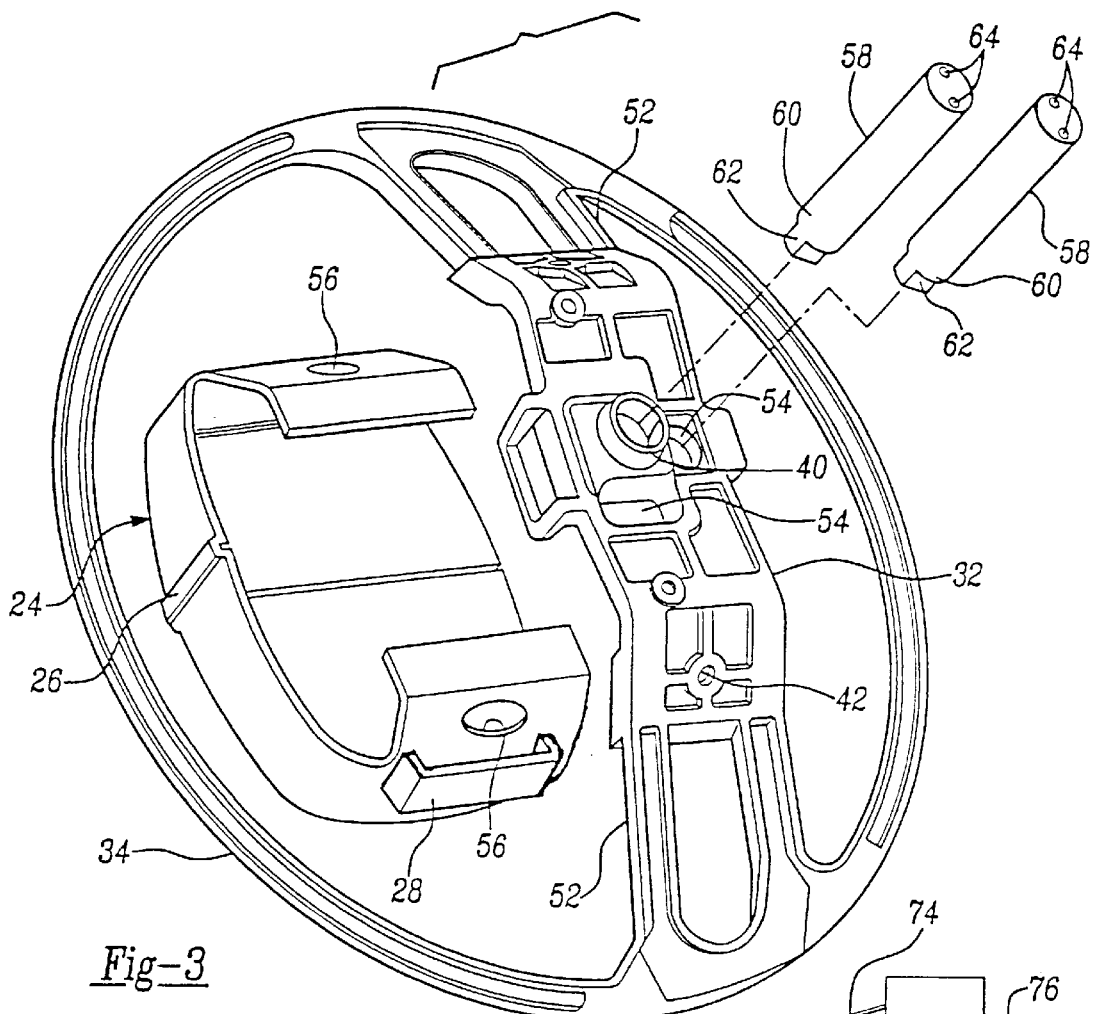
FIG. 3 is an exploded perspective view of the airbag scrim, a steering wheel armature, and a pair of positioning pins.

In FIG. 1, an integrated steering wheel assembly is shown generally at 20. A cover 22 covers the majority of integrated steering wheel assembly 20. An airbag scrim 24 is shown in phantom. In a non-integrated steering wheel assembly the outer dotted outline of the airbag scrim 24 would be the shape of a separate cover over an airbag 50. Airbag scrim 24 includes a tear seam 26 and a pair of pockets 28, only one of which is shown. Tear seam 26 has a linear unbranched shape unlike an H-shape or an I-shape. As used in this specification and the accompanying claims a linear unbranched shape refers to a shape that can be traced from one end to the other without ever recrossing a portion of the shape. In the most preferred embodiment, tear seam 26 is a straight line that extends completely across airbag scrim 24 and is located centrally to bisect airbag scrim 24 into two mirror image halves as shown in FIG. 3 below. As will be understood by one of ordinary skill in the art, tear seam 26 could have an orientation other than that shown in FIG. 1, for example, the orientation of tear seam 26 could be perpendicular or diagonal to the orientation shown in FIG. 1.

Figure 2:
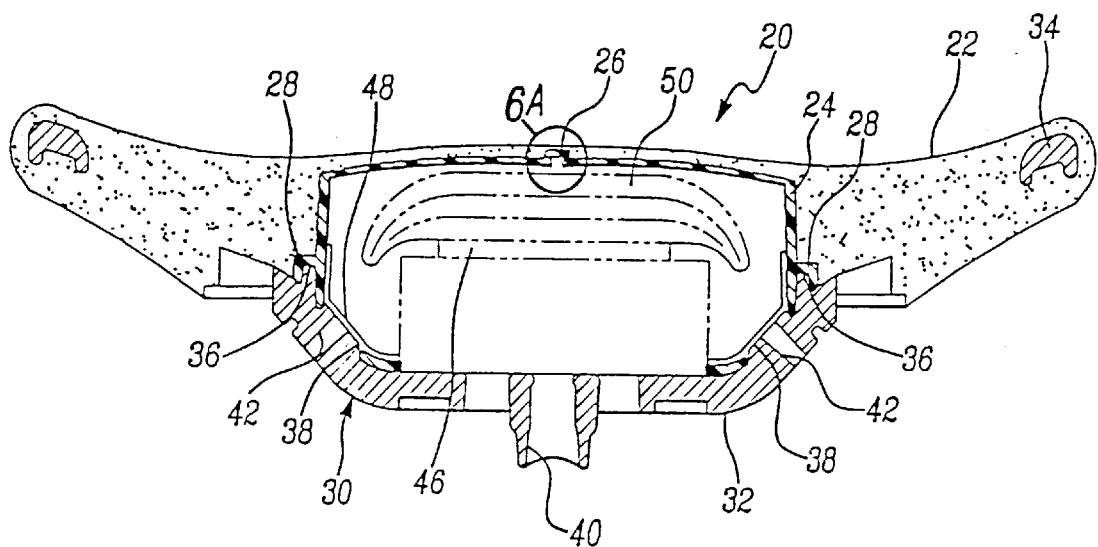
FIG. 2 is a cross-sectional view of the integrated steering wheel assembly.

FIG. 2 is a cross-sectional view of integrated steering wheel assembly 20. Integrated steering wheel assembly 20 includes a steering wheel armature 30 having a hub portion 32 and an outer rim portion 34. A pair of support tabs 36 and a pair of bosses 38 are located on the hub portion 32. An aperture 40 for the steering column (not shown) is also located on the hub portion 32. A mounting hole 42 is located in each of the bosses 38. Each of the pockets 28 on the airbag scrim 24 fit over one of the support tabs 36. An airbag inflator 46 mounted on an airbag inflator bracket 48 and an airbag 50, all shown in phantom, are located between the airbag scrim 24 and the hub portion 32. The airbag inflator bracket 48 is secured to the hub portion 32 by means of mounting bolts (not shown) that extend through mounting holes 42. The airbag inflator 46 and the airbag 50 are known in the art and form no portion of the present invention. As will be understood by one having ordinary skill in the art, the thickness of the cover 22 over the tear seam 26 would desirably be uniform and thin in order for the airbag inflator 46 to operate properly. The prior art has had difficulty in properly positioning the scrim during molding, and thus has had difficulty achieving uniform thickness.

FIG. 3 is an exploded perspective view of the airbag scrim 24 and the steering wheel armature 30. A plurality of spokes 52 connect the hub portion 32 to the outer rim portion 34. As will be understood by one having ordinary skill in the art, the shape of the spokes 52 and their location may be varied. The hub portion 32 includes a number of tooling apertures 54. A pair of apertures 56 are located on the airbag scrim 24. The apertures 56 are shaped to fit over the bosses 38. A pair of positioning pins 58 are used to position the airbag scrim 24 relative to the hub portion 32 when the cover 22 is being molded. The positioning pins 58 include a first end 60 and a boss 62 located on the first end 60. A pair of vacuum channels 64 extend through each positioning pin 58 to the first end 60. As will be understood by one of ordinary skill in the art vacuum channels 64 could be replaced by other pull down devices commonly used in the industry, for example, sucker pins (not shown).

Figure 4:
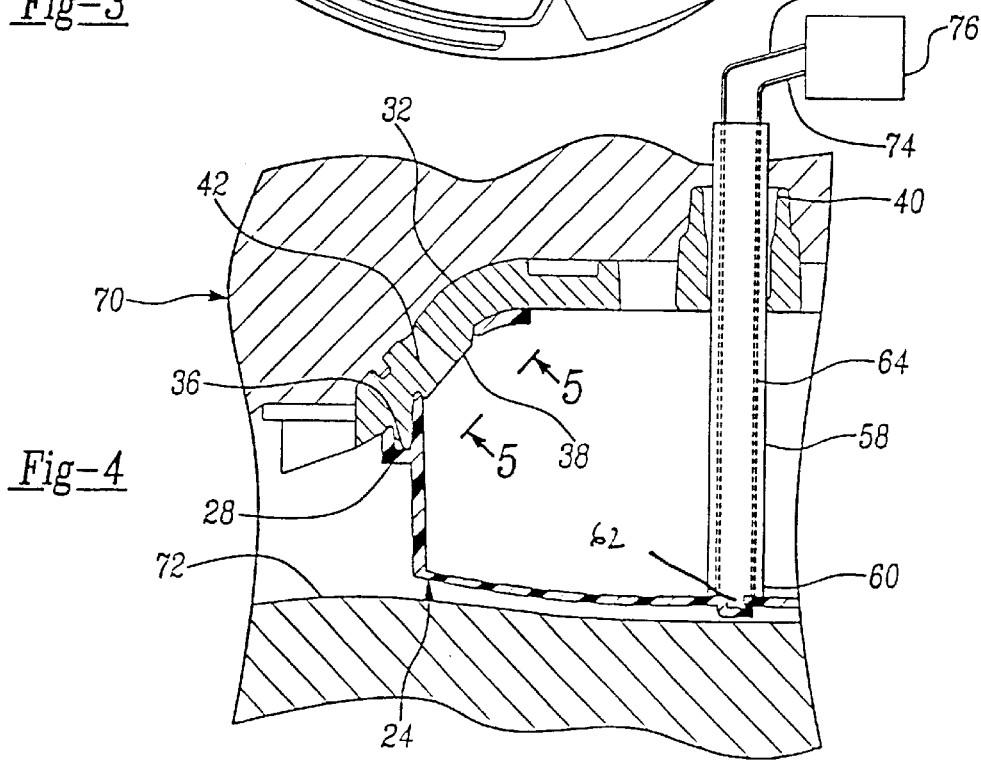
FIG. 4 is a partial cross-sectional view of the steering wheel armature and the airbag scrim in a cover mold.

FIG. 4 is a partial cross-sectional view of the steering wheel armature 30 and the airbag scrim 24 in a cover mold 70 prior to molding of the cover 22. The cover mold 70 includes a cavity 72 having a contour that is the same as the contour of the outer surface of the cover 22. A vacuum line 74 connects each vacuum channel 64 to a vacuum source 76. The vacuum source 76 is of a conventional type known in the art and could comprise an of the other pull down devices known in the industry as noted above. The boss 62 of each positioning pin 58 preferably extends into the tear seam 26 of the airbag scrim 24. The positioning pins 58 are located in the cover mold 70 to hold the airbag scrim 24 at the appropriate distance from the hub portion 32. When a vacuum from the vacuum source 76 is applied through the vacuum channels 64, the positioning pins 58 hold the airbag scrim 24 against the hub portion 32 while a cover material is added to the cover mold 70. The positioning pins 58 are shown as extending through aperture 40 and tooling aperture 54, as will be understood by one of ordinary skill, positioning pins 58 could extend through other parts of the hub portion 32.

Figure 5:
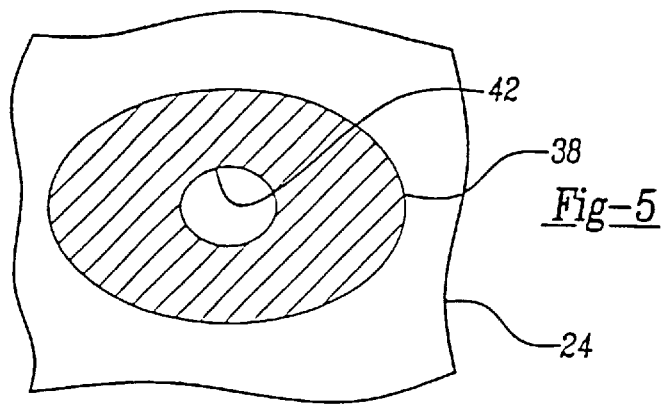
FIG. 5 is an enlarged view of a portion of the airbag scrim and a hub portion of the steering wheel armature.

As shown in FIG. 5, the apertures 56 in the airbag scrim 24 fit over the bosses 38 of the hub portion 32.

Figure 6A:
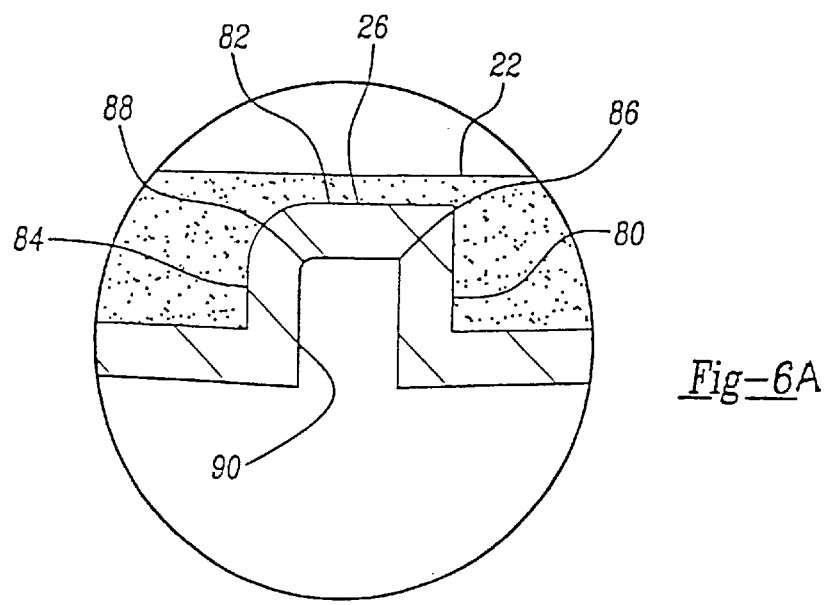
FIG. 6A is an enlarged cross-sectional view of a first embodiment of a tear seam on the airbag scrim.
Figure 6B:
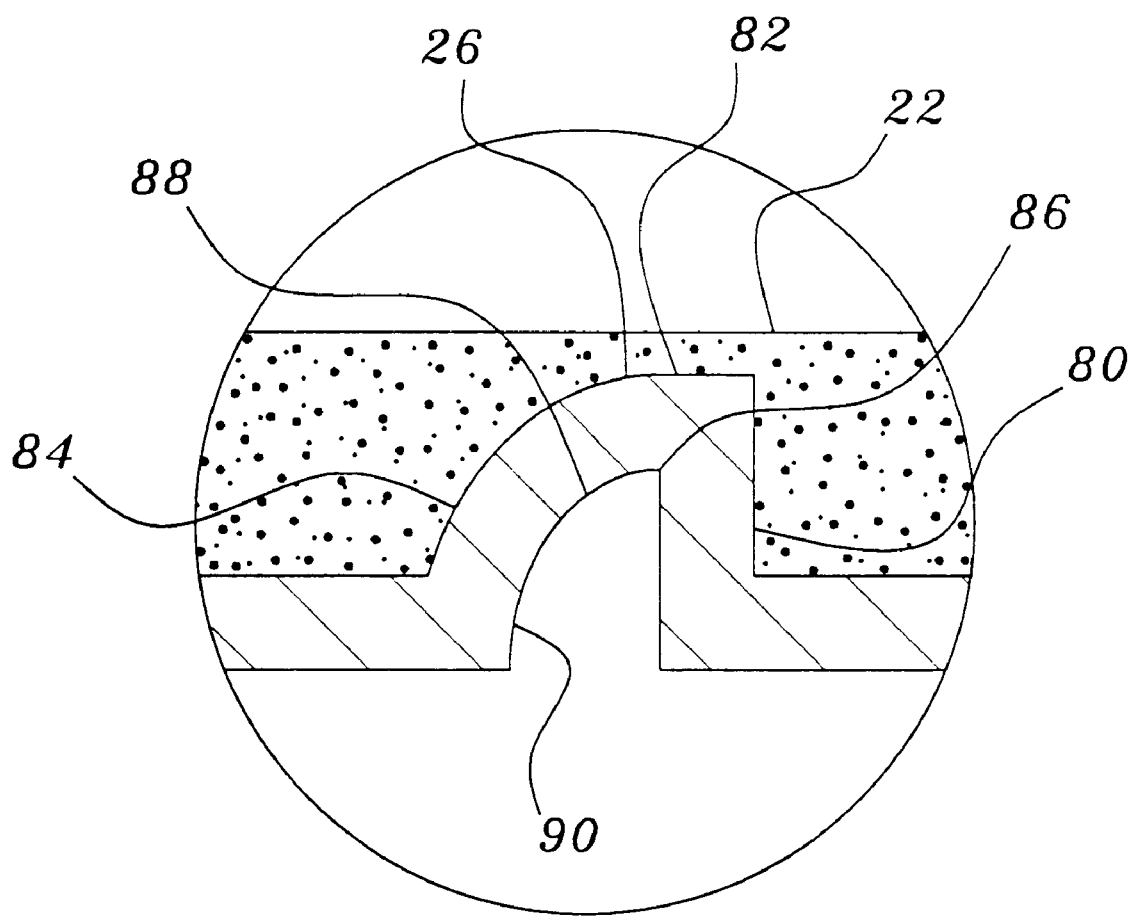
FIG. 6B is an enlarge cross-sectional view of a second embodiment of a tear seam on the airbag scrim.

FIG. 6A is an enlarged view of a first embodiment of the tear seam 26. The tear seam 26 includes a first wall 80, a second wall 82 and a third wall 84. The second wall 82 is oriented at an angle to the first wall 80 and the third wall 84. In FIG. 6 second wall 82 is shown as substantially perpendicular to first wall 80 and third wall 84, as will be understood by one of ordinary skill in the art second wall 82 need not be perpendicular to first wall 80 and third wall 84 (see FIG. 6B below). A first joint 86 having a nearly 90° shape joins the second wall 82 to the first wall 80. As will be understood by one having ordinary skill in the art, first joint 86 needs to include sufficient draft to permit it to be released from a tool (not shown) used to form airbag scrim 24. A second joint 88 having a radiused shape joins the second wall 82 to the third wall 84. The first wall 80 and third wall 84 are attached to airbag scrim 24. The first wall 80, second wall 82 and third wall 84 form a cavity 90. Because of the sharp corner, the first joint 86 has a lower fracture resistance than the second joint 88, which has a radiused shape. Thus, the tear seam 26 is designed such that when the airbag inflator 46 inflates the airbag 50, the tear seam 26 ruptures along the first joint 86. When the steering wheel armature 30 is positioned in the cover mold 70, the bosses 62 of the positioning pins 58 are located in cavity 90. As shown in FIGS. 1 and 3 the tear seam 26 bisects the airbag scrim 24 into two mirror image halves. As will be understood by one of ordinary skill in the art tear seam 26 could be positioned in a location other than the center of airbag scrim 24. The tear seam 26 provides a wide opening for airbag 50 when airbag 50 deploys.

FIG. 6B shows an enlarged view of a second embodiment of the tear seam 26. The difference between FIG. 6A and 6B resides in the radius of second joint 88 and the relative sizes of the second wall 82 and third wall 84. In this embodiment, second joint 88 is more of an arc than the shape shown in FIG. 6A and third wall 84 and second wall 82 flow into each other. Just as in FIG. 6A, first joint 86 has a lower fracture resistance than second joint 88.

Figure 7:
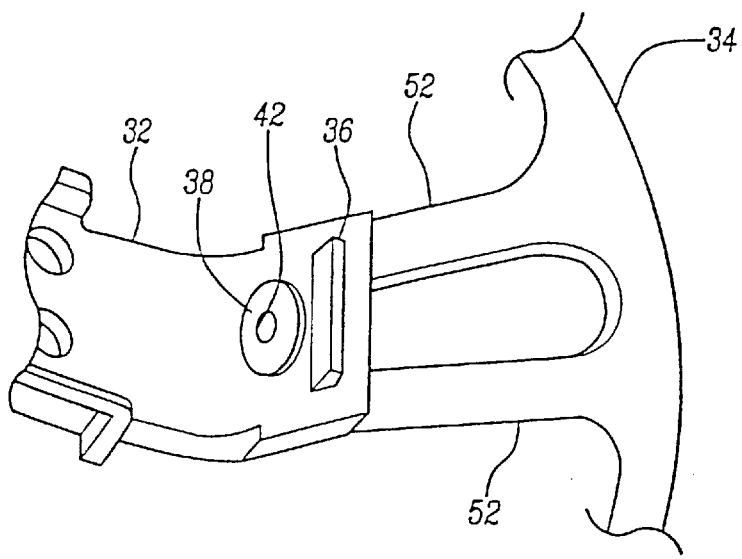
FIG. 7 is a perspective view of a portion of the steering wheel armature.

FIG. 7 is a perspective view of a portion of the steering wheel armature 30. FIG. 7 shows the relationship between the hub portion 32, boss 38, support tab 36, spokes 52, and outer rim portion 34.

As will be understood by one having ordinary skill in the art, the cover 22 could be formed from a wide variety of materials. It is most preferable that the cover 22 be formed from class A urethane. Cover 22 could also be formed of a material such as a thermoplastic. The steering wheel armature 30 is most preferably formed from magnesium, but could also be formed of other materials such as die cast aluminum.

The tear seam 26 has been described in the environment of an integrated steering wheel assembly 20. As will be understood by one of ordinary skill in the art the tear seam 26 could also be used in an airbag designed for another location, for example, an airbag located on the passenger side of a vehicle.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:
1. A steering wheel assembly comprising:
 a steering wheel armature having a hub portion, an outer rim portion and a plurality of spokes extending between said hub portion and said outer rim portion;
 an airbag scrim having a linear unbranched tear seam, said airbag scrim secured to said hub portion; and
 a cover covering a portion of said steering wheel armature and a portion of said airbag scrim.

2. A steering wheel assembly as recited in claim 1 wherein said tear seam is a straight line and extends completely across said airbag scrim.

3. A steering wheel assembly as recited in claim 2 wherein said tear seam is located centrally in said airbag scrim, said tear seam bisecting said airbag scrim into two mirror image halves.

4. A steering wheel assembly as recited in claim 1 wherein said tear seam comprises a first wall, a second wall and a third wall;

said first wall attached to said second wall by a first joint;

said third wall attached to said second wall by a second joint;

said first wall and said third wall attached to said airbag scrim; and one of said first joint and said second joint having a lower fracture resistance than the other of said first joint and said second joint.

5. A steering wheel assembly as recited in claim 4 wherein said second wall is at an angle to said first wall and said third wall;

said first joint is a substantially 90° joint; and said second joint is a radiused joint, said first joint having a lower fracture resistance than said second joint.

6. An airbag tear seam comprising:

a first wall, a second wall, and a third wall;

said first wall attached to said second wall by a first joint;

said third wall attached to said second wall by a second joint; and one of said first joint and said second joint having a lower fracture resistance than the other of said first joint and said second joint.

7. An airbag tear seam as recited in claim 6 wherein said second wall is at an angle to said first wall and said third wall;

said first joint is a substantially 90° joint; and said second joint is a radiused joint, said first joint having a lower fracture resistance than said second joint.

8. A airbag tear seam as recited in claim 6 wherein:

said third wall, said second joint and said second wall form an arc; and said first joint is a substantially 90° joint.

* * * * *